J. S. KERN.
WINDSHIELD.
APPLICATION FILED APR. 27, 1920.
1,378,871.
Patented May 24, 1921.
2 SHEETS—SHEET 1.
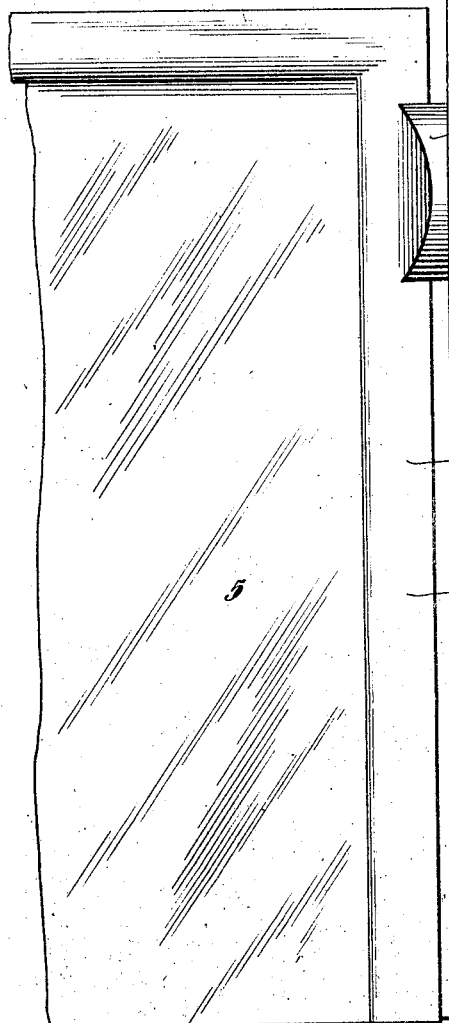
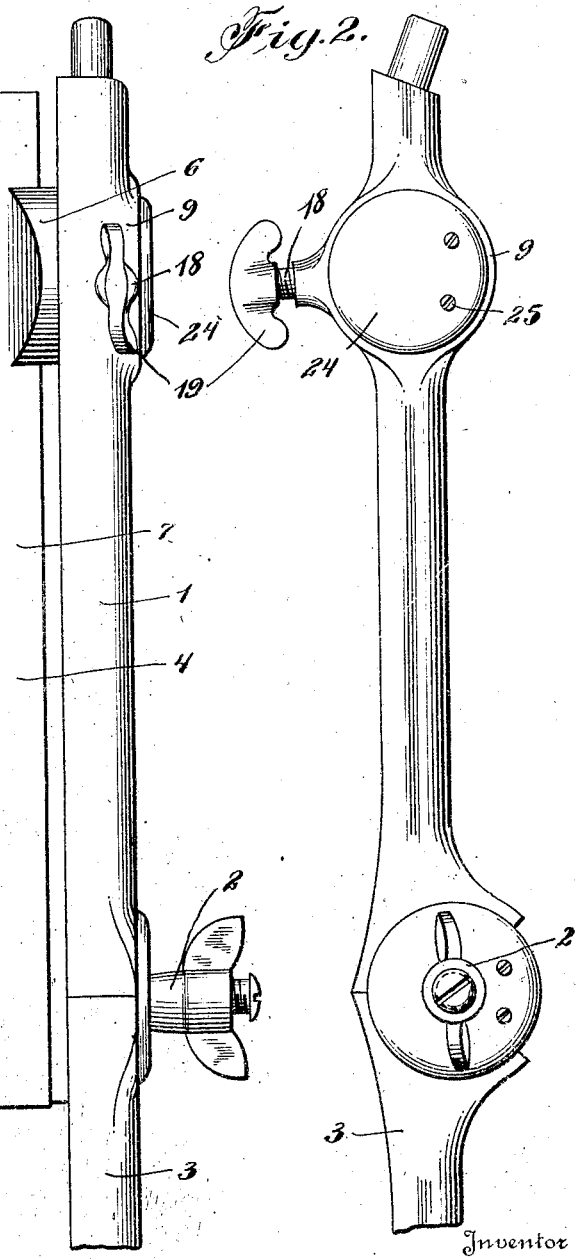
Inventor
Jacob S. Kern

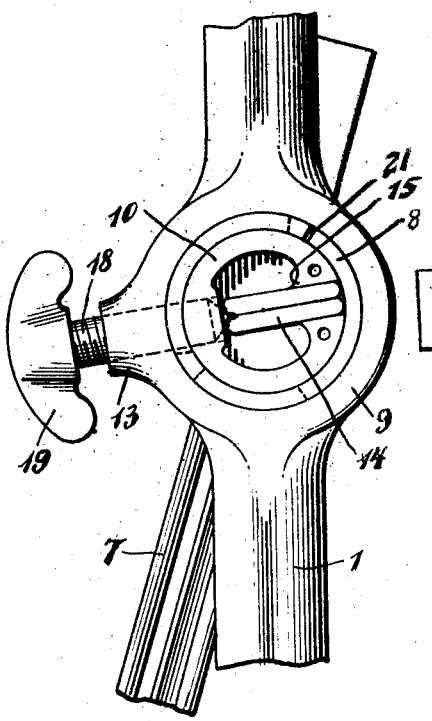
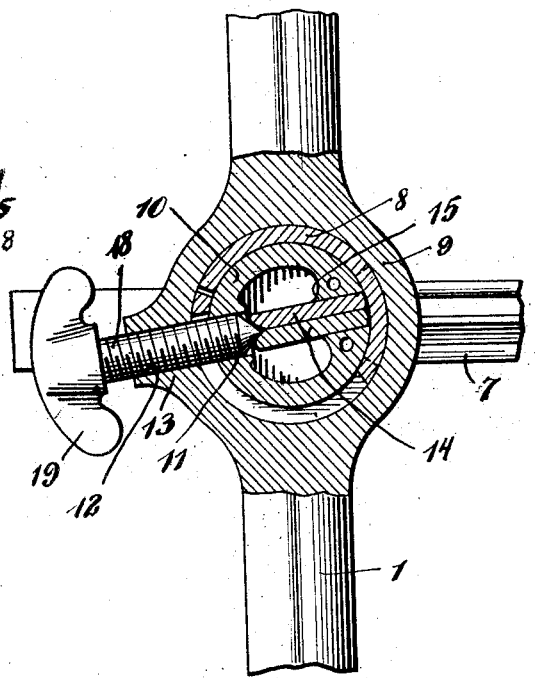
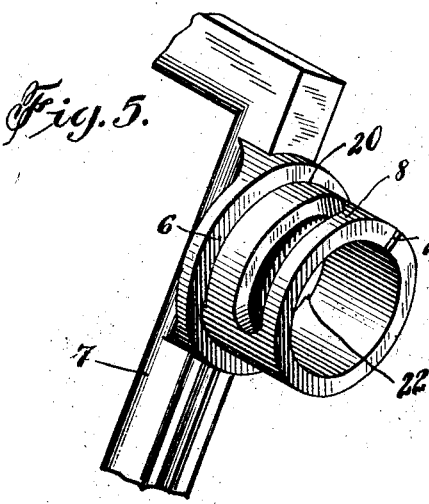

UNITED STATES PATENT OFFICE.

JACOB S. KERN, OF FLEETWOOD, PENNSYLVANIA.

WINDSHIELD.

1,378,871. Specification of Letters Patent. Patented May 24, 1921.

Application filed April 27, 1920. Serial No. 376,923.

*To all whom it may concern:*

Be it known that I, JACOB S. KERN, a citizen of the United States, residing at Fleetwood, in the county of Berks and State of Pennsylvania, have invented certain new and useful Improvements in Windshields, of which the following is a specification.

This invention relates to new and useful improvements in wind shields and more especially to an improved friction device for securely holding or clamping the same at the desired angle or adjustment.

With the foregoing and other objects in view that will readily appear as the nature of the invention is better understood, the same consists in the novel features of construction, combination and arrangement of parts illustrated in the drawings and more particularly pointed out in the appended claim.

In the accompanying drawings, which are for illustrative purposes only and are therefore not drawn to scale:—

Figure 1 is a front elevational view, illustrating the application of my invention.

Fig. 2 is an edge view of Fig. 1.

Fig. 3 is a fragmentary edge view of one of the standards of the supporting frame and the wind shield frame, with the cover plate for the friction device removed and the wind shield shown at an inclination.

Fig. 4 is a similar view with the friction device shown in vertical section and the wind shield frame swung into a position at right angles with the supporting frame.

Fig. 5 is a horizontal section and Fig. 6 is a detail fragmentary perspective view of one corner of the wind shield and the clamping sleeve associated therewith.

Referring to the drawings for a more particular description of the invention and in which drawings like parts are designated by like reference characters throughout the several views, the numeral 1 represents the upper right hand standard of the wind shield supporting frame, which is suitably hinged or pivoted at its lower end, as at 2, to the lower companion standard 3 of said frame. The wind shield frame 4 carrying the usual glass wind shield 5, is pivoted at its upper corners, as at 6, to the supporting frame standards 1, and is adapted to swing both inwardly to a limited extent, as indicated in Fig. 3 and outwardly to a position at right angles with the supporting frame, as indicated in Fig. 4.

In carrying out my invention, the vertical end bars 7 of the wind shield frame, are formed at their outer edges, adjacent their upper ends, with the outwardly extending transversely split clamping sleeves 8, which work in corresponding hollow cylindrical enlargements or collars 9 formed at the upper ends of the standards. A hollow split sleeve spreading ring 10 of brass or other suitable resilient metal, is freely mounted within the clamping sleeve 8 and is provided with a transverse interiorly threaded opening 11 disposed in alinement with the interiorly threaded opening 12 in the boss 13 of the enlargement or collar 9. The ends of the ring 10 are disposed opposite the threaded opening 11 and are spread apart or separated to provide a sufficient space to receive the outer edges of the flat rectangular oblong expanding plates 14. As shown, the ends of the spreading ring are straight and are provided at their inner edges with the inwardly extending extensions 15, which form a fulcrum for the spreading plates in expanding the spreading ring and clamping sleeve. The outer edges of the expanding plates are formed with the corresponding registering recesses 16 adapted to receive the inner conical end, as 17, of the adjusting screw 18, which works through the screw threaded openings 11 and 12 and is formed with the wing-shaped head 19 to facilitate turning.

The clamping sleeve is formed with an arcuate slot 20 which extends from a point adjacent its transverse slit 21 to a point adjacent one end of its inner cut away portion 22. In practice, when the adjusting screw is screwed in until its inner end is adjacent to or merely seats in the recesses 16 of the expanding plates 14, as illustrated in Figs. 3, 4 and 5 of the drawings, the wind shield may be adjusted either in the position shown in Fig. 3 or that shown in Fig. 4 or any position intermediate or between such two extreme positions, when a further slight turning of the adjusting screw will separate or spread the inner edges of the expanding plates 14 and with the extensions 15 acting as a fulcrum will expand the spreading ring which in turn will expand the split end portions 23 of the clamping sleeve. This will not only cause the split end portions of the clamping sleeve to frictionally engage the inner wall of the enlargement or collar, but will also cause the spreading ring to securely clamp or frictionally engage the inner wall of the clamping sleeve. As a result, the clamping sleeve will be frictionally held against turning both at its inner and outer walls and the wind shield accordingly held securely in adjusted position.

The cover plate 24 fits over the clamping sleeve and associated parts of the friction device and is held in removable position by the fastening screws 25.

From the foregoing description taken in connection with the drawings, it is thought that the construction, operation and advantages of this invention will be readily understood without requiring a more extended explanation.

Having described my invention, what I claim as new and desire to secure by Letters Patent, is:—

In a device of the character specified, the combination with a standard of the supporting frame, said standard provided with a hollow cylindrical enlargement, of a wind shield frame provided at one end with a transversely split clamping sleeve working in said enlargement, a resilient expanding ring with spaced apart ends arranged in the clamping sleeve, said expanding ring provided with an interiorly threaded opening, a pair of flat expanding plates arranged with their outer edges fitting between the spaced ends of the expanding ring and an adjusting screw working through the enlargement and interiorly threaded opening of the expanding ring and formed with a cone shaped inner end adapted to engage corresponding registering recesses formed in the inner edges of the expanding plates.

In testimony whereof I affix my signature.

JACOB S. KERN.